United States Patent
Böhm et al.

(10) Patent No.: US 10,150,874 B2
(45) Date of Patent: Dec. 11, 2018

(54) GRAPHENE BASED ANTI-CORROSION COATINGS

(71) Applicant: TATA STEEL UK LIMITED, London (GB)

(72) Inventors: Henagama Liyanage Mallika Böhm, Rotherham (GB); Sivasambu Böhm, Rotherham (GB); Dammes Hans Van Der Weijde, Woerden (NL)

(73) Assignee: TATA STEEL UK LIMITED, London (GB)

( * ) Notice: Subject to any disclaimer, the term of this patent is extended or adjusted under 35 U.S.C. 154(b) by 226 days.

(21) Appl. No.: 15/105,209

(22) PCT Filed: Dec. 18, 2014

(86) PCT No.: PCT/EP2014/025026
§ 371 (c)(1),
(2) Date: Jun. 16, 2016

(87) PCT Pub. No.: WO2015/090622
PCT Pub. Date: Jun. 25, 2015

(65) Prior Publication Data
US 2016/0312038 A1    Oct. 27, 2016

(30) Foreign Application Priority Data

Dec. 19, 2013 (EP) .................................. 13198361
Mar. 21, 2014 (EP) .................................. 14161011

(51) Int. Cl.
| | | |
|---|---|---|
| C09D 5/08 | (2006.01) | |
| C09D 183/06 | (2006.01) | |
| C09D 183/08 | (2006.01) | |
| C23C 26/00 | (2006.01) | |
| C23C 18/12 | (2006.01) | |
| B05D 7/00 | (2006.01) | |
| C09D 5/24 | (2006.01) | |
| C09D 183/10 | (2006.01) | |
| C01B 32/19 | (2017.01) | |
| C09D 7/61 | (2018.01) | |
| B05D 5/00 | (2006.01) | |
| C08K 3/04 | (2006.01) | |
| C01B 32/192 | (2017.01) | |
| C01B 32/194 | (2017.01) | |
| B05D 7/14 | (2006.01) | |
| C08G 77/42 | (2006.01) | |

(52) U.S. Cl.
CPC ............ *C09D 5/084* (2013.01); *C01B 32/192* (2017.08); *C01B 32/194* (2017.08); *C09D 5/24* (2013.01); *C09D 7/61* (2018.01); *C09D 183/10* (2013.01); *C23C 26/00* (2013.01); *B05D 5/00* (2013.01); *B05D 7/14* (2013.01); *B05D 2252/02* (2013.01); *C08G 77/42* (2013.01); *C08K 3/042* (2017.05); *C23C 2222/20* (2013.01)

(58) Field of Classification Search
CPC .......... C08K 3/042; C09D 5/24; C09D 5/084; C09D 7/61; C09D 7/62; C01B 32/198; C23C 2222/20; C23C 26/00
See application file for complete search history.

(56) References Cited

U.S. PATENT DOCUMENTS

| | | | |
|---|---|---|---|
| 2008/0031804 A1* | 2/2008 | Taki .................. | B82Y 10/00 423/447.7 |
| 2009/0022649 A1† | 1/2009 | Zhamu | |
| 2010/0065788 A1 | 3/2010 | Momose et al. | |
| 2010/0272991 A1† | 10/2010 | Park | |
| 2012/0202047 A1 | 8/2012 | Welch et al. | |
| 2014/0147645 A1 | 5/2014 | Jung et al. | |

FOREIGN PATENT DOCUMENTS

| | | | |
|---|---|---|---|
| CN | 102796375 | A † | 11/2012 |
| CN | 103173095 | A † | 6/2013 |
| CN | 103332670 | A † | 10/2013 |
| CN | 103436017 | A † | 12/2013 |
| EP | 2198982 | A2 † | 6/2010 |
| KR | 101221839 | B1 † | 1/2013 |
| KR | 20130008855 | A | 1/2013 |
| WO | 2012145911 | A1 † | 11/2012 |

OTHER PUBLICATIONS

Sigma-Aldrich, Multi-Walled Carbon Nanotube Catalog web page, found at https://www.sigmaaldrich.com/catalog/product/aldrich/791431?lang=en&region=US (retrieved Mar. 23, 2017).*
Shin-Etsu Silicone, Silane Coupling Agents (2012).*
European Search Report dated May 20, 2014 for EP13198361.
International Search Report and Written Opinion dated Mar. 20, 2015 from International Application PCT/EP2014/025026 to TATA STEEL UK LIMITED filed Dec. 18, 2014.

* cited by examiner
† cited by third party

*Primary Examiner* — Kregg T Brooks
(74) *Attorney, Agent, or Firm* — Vorys, Sater, Seymour and Pease LLP

(57) ABSTRACT

A coated strip or sheet including:
a steel strip or sheet,
a zinc or zinc alloy coating on the steel strip or sheet,
a coating system for inhibiting corrosion, and
a top coat, wherein the coating system includes a corrosion inhibitive composition that includes graphene and graphene stacks including 2-20 layers of graphene and a coupling agent including an organofunctional siloxane coupled to graphene and the graphene stacks.

23 Claims, No Drawings

GRAPHENE BASED ANTI-CORROSION COATINGS

CROSS-REFERENCE TO RELATED APPLICATIONS

This is a § 371 National Stage Application of International Application No. PCT/EP2014/025026 filed on Dec. 18, 2014, claiming the priority of European Patent Application No. 13198361.1 filed on Dec. 19, 2013 and European Patent Application No. 14161011.3 filed Mar. 21, 2014.

The invention relates to a steel strip or sheet provided with a coating system that comprises a corrosion inhibitive composition. The invention also relates to a method for manufacturing the coated steel strip or sheet and to a method for preparing a corrosion inhibitive composition.

The corrosion protection of steel substrates is currently achieved by the application of one or more inorganic and/or organic coating layers on the substrate. Generally, the steel substrate is provided with a zinc or zinc alloy coating. The zinc or zinc alloy coating is then provided with a pre-treatment layer in order to improve adhesion between the zinc or zinc alloy coating and subsequently applied coating layers. The pre-treatment layer typically comprises hexavalent chromium. A primer layer is then applied onto the pre-treatment layer in order to promote adhesion between a top coat that is provided for barrier and aesthetic purposes, and the coated steel substrate. The primer is provided to prevent or at least reduce the propagation of corrosive agents towards the zinc or zinc alloy surface. The primer is also provided to protect the steel substrate from corrosion when the coated steel substrate is cut or scratched. Corrosion inhibitors based on hexavalent chromium are known to be very suitable for this purpose.

When the coated steel substrate is cut or scratched the zinc or zinc alloy coating becomes exposed to atmospheric corrosive agents such as water, oxygen and corrosive electrolytes. In turn, zinc is preferentially dissolved to produce zinc cations and electrons. Oxygen and water then react with electrons at the cathodic zinc sites to produce hydroxyl ions. As a result, there is an increase in local pH within the coating, which causes the coating to degrade. Moreover, if corrosion propagation is not inhibited or stopped, then zinc in the zinc or zinc alloy coating will become exhausted, resulting in a significant increase in the rate of corrosion, and in certain instances coating delamination.

The incorporation of chromate corrosion inhibitors into the primer reduces coating degradation by inhibiting the dissolution of zinc. Zinc ions react with chromates ($CrO_4^{2-}$) present in the primer to form an insoluble zinc chromate salt ($ZnCrO_4$) that acts as a physical barrier to the corrosive agents such as water and oxygen, thereby reducing the further dissolution of zinc. The mechanism of corrosion inhibition is set out below:

Zinc dissolves to produce zinc ions and electrons at an anodic site:

$$Zn_{(s)} \rightarrow Zr^{2+}_{(aq)} + 2e^-$$

Oxygen and water react with the electrons at the cathodic site to produce hydroxyl ions:

$$O_{2(g)} + H_2O_{(aq)} + 4e^- \rightarrow 4OH^-_{(aq)}$$

The zinc ions react with chromate ions to produce a zinc chromate precipitate:

$$Zn^{2+}_{(aq)} + 2CrO_4^{2-}_{(aq)} \rightarrow ZnCrO_{4(s)}$$

Although chromates are generally regarded as being anodic corrosion inhibitors, it is also understood that when hexavalent chromium inhibitors are reduced to $Cr^{3+}$, the $Cr^{3+}$ ions contribute to inhibiting the cathodic corrosion process:

$$Cr^{3+} + OH^- \rightarrow Cr(OH)_{3(s)}$$

Chromate corrosion inhibitors can be considered to be unique in that they can provided both anodic and cathodic corrosion inhibition.

However, there are disadvantages of using chromate corrosion inhibitors, namely that they are known to be toxic and in certain cases carcinogenic, meaning that such compounds are dangerous to human health and environmentally unacceptable.

In view of the toxic and carcinogenic nature of chromate corrosion inhibitors, manufacturers are now looking to use chromium-free corrosion inhibitors as a replacement. However, one draw back of existing chromium-free corrosion inhibitors is that one inhibitor cannot provide anodic and cathodic inhibition. Another drawback is the undesirable formation of insoluble salts that are formed when anodic and cathodic chromium-free inhibitors are provided in the same coating layer. Thus, in order for a coating system to provide anodic and cathodic corrosion inhibition, the chromium-free anodic and cathodic inhibitors must be kept apart. This is generally achieved by providing a coating system that comprises at least one coating layer that contains the chromium-free anodic corrosion inhibitors and another coating layer that contains the chromium-free cathodic corrosion inhibitors. However, this has the drawback that additional coating layers have to be applied, which is both time consuming and expensive.

It is an object of the present invention to provide a corrosion inhibitive coating that comprises chromium-free corrosion inhibitors.

It is another object of the invention to provide a corrosion inhibitive coating system that comprises fewer coating layers.

It is a further object of the invention to provide a corrosion inhibitive coating that comprises chromium-free corrosion inhibitors, and which exhibits comparable corrosion inhibition performance relative to corrosion inhibitive coatings that comprise chromates.

One or more of the above objects is achieved by providing a coated strip or sheet comprising:
- a steel strip or sheet,
- a zinc or zinc alloy coating on the steel strip or sheet,
- a coating system for inhibiting corrosion, and
- a top coat, wherein the coating system comprises a corrosion inhibitive composition that comprises graphene and graphene stacks comprising 2-20 layers of graphene and a coupling agent coupled to graphene and the graphene stacks.

The inventors found that corrosion of the steel strip or sheet could be reduced significantly by providing a coating system that comprised the corrosion inhibitive composition. The reduction in corrosion has been attributed, at least in part, to graphene in the corrosion inhibition composition inhibiting the dissolution of zinc. It was found that the diffusion of corrosive agents such as water, oxygen and corrosive ions, through the honeycomb lattice structure of graphene was prevented and therefore they were substantially prevented from coming into contact with zinc, and causing its dissolution. Graphene is therefore considered to be an effective replacement for the insoluble salt ($ZnCrO_4$) that is formed following the reaction of chromate corrosion inhibitors with zinc ions at cathodic zinc sites. In addition to single layer graphene, corrosive agents are also substantially prevented from coming into contact with zinc by the graphene stacks comprising 2-20 layers of graphene.

By functionalising graphene and the graphene stacks with a coupling agent, the porosity of the coating system is reduced, having the effect of inhibiting the diffusion of corrosive agents towards the zinc or zinc alloy surface. The coupling agent is also suitable for coupling graphene and the graphene stacks to the zinc or zinc alloy surface. Thus, graphene and the graphene stacks preferentially concentrate at the zinc or zinc alloy surface instead of being distributed randomly throughout the coating system. This has the effect of improving corrosion inhibition because a more homogeneous graphene barrier layer is formed at the zinc or zinc alloy surface. Moreover, by functionalising graphene and the graphene stacks with a coupling agent strong chemical bonds are formed with the zinc or zinc alloy surface. It also means that relative to a composition comprising non-functionalised graphene or another pigment, e.g. mica, the amount of graphene and graphene stacks in the corrosion inhibited composition can be reduced, while maintaining the same level of corrosion protection. This offers advantages both in terms of cost and the processing of the corrosion inhibitive composition.

In a preferred embodiment the coating system comprises at least 0.01 wt % of the corrosion inhibitive composition. When the coating system comprises 0.01 wt % of the corrosion inhibitive composition, reductions in water and oxygen permeation are obtained. Preferably the coating system comprises at least 0.1 wt % of the corrosion inhibitive composition since a greater corrosion inhibitive effect may be obtained.

In a preferred embodiment the corrosion inhibitive composition comprises chromium-free corrosion inhibitors intercalated between graphene layers of the graphene stacks. It was found that chromium-free corrosion inhibitors could be intercalated into the graphene stacks and that the intercalated compound was very suitable for providing active corrosion protection. By active corrosion protection it is meant that the chromium-free corrosion inhibitors are released from the graphene stacks in response to a change in the local environment. For example, the chromium-free corrosion inhibitors may be released in response to a change in local pH resulting from the reaction of water and oxygen with electrons generated during zinc dissolution.

In a preferred embodiment the chromium-free corrosion inhibitors comprise one or more cations selected from zinc, magnesium, titanium, zirconium, yttrium, lanthanum and cerium. These inhibitors are particularly suitable for reacting with hydroxyl ions resulting from the corrosion process to form an insoluble precipitate. The example below shows the formation of a cerium hydroxide insoluble precipitate:

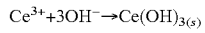

$Ce^{3+}+3OH^- \rightarrow Ce(OH)_{3(s)}$

The insoluble precipitate inhibits the further dissolution of zinc leading to a reduction in the rate of corrosion. Preferably the chromium-free corrosion inhibitors comprise salts of zinc, magnesium, titanium, zirconium, yttrium, lanthanum and cerium. Preferably the salts comprise acetate, nitrate or sulphate anions. Cerium acetate is a particularly preferred salt.

As a first coupling agent an organosilane can be used, for instance a hydroxysilane, an epoxysilane or an aminosilane. By functionalising graphene and the graphene stacks with an organosilane, improvements in barrier protection can be obtained. This is because the organosilane can form strong bonds with graphene and the graphene stacks as well as the zinc or zinc alloy coating.

In a preferred embodiment the first coupling agent comprises an organofunctional siloxane, preferably an organofunctional siloxane oligomer. Very good barrier and adhesion properties are obtained when graphene and the graphene stacks are functionalised with an organofunctional siloxane or an organofunctional siloxane oligomer. The organofunctional siloxane or siloxane oligomer having one or more organofunctional groups selected from monoamines, diamines, amino-alkyls and alkyls, epoxies and hydroxyls. These functional groups are very suitable for reacting with graphene and the graphene stacks. By using epoxy functional siloxanes or siloxane oligomers good adhesion between the coating system and the zinc or zinc alloy coating and/or an adjacent coating layer can be obtained. According to a further aspect preferably amino hydroxysiloxanes, amino epoxysiloxane or amino alkylsiloxane are used.

The use of siloxanes and siloxanes oligomers is preferred over the use of silanes, since the siloxanes provide a good balance between hardness and flexibility, whereas silanes will provide a more brittle structure which may lead to microcracking with mechanical processing of the strip or sheet material.

In a preferred embodiment the corrosion inhibitive composition comprises a second coupling agent. When graphene and the graphene stacks are functionalised with a first coupling agent and a second coupling agent, strong chemical bonds are formed between adjacent graphenes and graphene stacks. By chemically linking graphene and the graphene stacks a more homogeneous barrier layer may be formed at or near the zinc or zinc alloy surface.

In a preferred embodiment the second coupling agent comprises an organofunctional siloxane, preferably an organofunctional siloxane oligomer, having one or more organofunctional groups selected from monoamines, diamines, amino-alkyls and alkyls, epoxies and hydroxyls. These functional groups are very suitable for reacting with graphene and the graphene stacks as well as with other organofunctional siloxanes to form a protective barrier layer at the zinc or zinc alloy surface. According to a further aspect preferably amino hydroxysiloxanes, amino epoxysiloxane or amino alkylsiloxane are used.

In a preferred embodiment the graphene stacks comprise between 4 and 20 layers of graphene and preferably between 4 and 10 layers of graphene. When the graphene stacks comprise between 4 and 20 or between 4 and 10 layers of graphene, the coating system possesses a good combination of stiffness and flexibility.

In a preferred embodiment the coating system comprises a primer between the zinc or zinc alloy coating and the top-coat, said primer comprising the corrosion inhibitive composition. Since the primer exhibits very good corrosion inhibitive properties, it is not necessary to provide a further primer between the primer containing the corrosion inhibitive composition and the top coat. The primer preferably has a thickness between 10 and 15 μm.

In a preferred embodiment a chromium-free pre-treatment layer is provided between the zinc or zinc alloy coating and the primer. The pre-treatment layer preferably has a thickness of less than 1 μm.

In a preferred embodiment the top coat preferably has thickness between 15 and 200 μm. For instance, when the top coat comprises polyesters, it is preferred that the top coat has a thickness of at least 15 μm. When the top coat comprises polyurethanes, the top coat preferably has a thickness of at least 25 μm. Finally, when the top coat comprises plastisols, it is preferred that the top coat has a thickness between 100 and 200 μm. It will be appreciated that the choice of a certain top coat material and/or thickness depends on the end application of the coated product.

It will be appreciated that while it is not strictly necessary to provide a further primer, for certain applications where additional corrosion protection is desired, further primers may nevertheless be incorporated into coating system.

In a preferred embodiment the coating system comprises the primer containing the corrosion inhibitive composition and a second primer provided between the primer and the top coat. In view of the corrosion inhibitive properties of the primer, the thickness of the second primer may be reduced, leading to a reduction in coating weight and manufacturing costs.

In a preferred embodiment a chromium-free pre-treatment layer is provided between the zinc or zinc alloy coating and the primer, the thickness of the primer containing the corrosion inhibitive composition is preferably between 1 and 3 μm and the second primer preferably has a thickness between 15 and 20 μm.

It will also be appreciated that for certain applications it is not necessary to provide a pre-treatment layer. However, for such cases, it may be necessary to increase the thickness of the primer and/or provide a second primer.

In preferred embodiment the coating system comprises the primer containing the corrosion inhibitive composition and a second primer. Preferably the thickness of the primer is between 5 and 10 μm and the thickness of the second primer is between 10 and 15 μm.

In a preferred embodiment the coating system comprises a pre-treatment primer between the zinc or zinc alloy coating and the top-coat. Preferably the pre-treatment primer has a thickness between 1 and 3 μm. When the coating system comprises the pre-treatment primer, it is not necessary to provide a pre-treatment layer or a primer since the pre-treatment primer comprising the corrosion inhibitive composition provides sufficient adhesion and corrosion inhibition properties to protect the steel strip or sheet and to adhere the top coat. This also has the benefit that the cost of manufacturing the organic coated strip or sheet is reduced since the coating system comprises fewer coating layers.

A second aspect of the invention relates to a method for preparing a corrosion inhibitive composition, which comprises the steps of:
  subjecting a composition that contains water and a graphene precursor to at least two mechanical treatments and to a chemical treatment in order to form graphene and graphene stacks comprising 2-20 layers of graphene;
  separating graphene and the graphene stacks from the mechanically and chemically treated composition to form a graphene based composition;
  mixing the graphene based composition with a first coupling agent comprising an organofunctional siloxane that is capable of reacting with graphene and the graphene stacks, and
  mixing the graphene based composition with chromium-free corrosion inhibitors to form an intercalated graphene compound in which the chromium-free corrosion inhibitors are intercalated between the graphene layers of the graphene stack.

In the context of the present invention the term "graphene precursor" shall refer to multilayer graphene comprising >20 layers of graphene.

The inventors found that a corrosion inhibitive composition could be obtained under ambient conditions and at low cost. Unlike conventional methods for preparing graphene based compositions, which subject compositions containing a graphene precursor to a single mechanical treatment or to single a chemical treatment, the above method subjects the compositions containing a graphene precursor to at least two mechanical treatments and to a chemical treatment.

Preferably the graphene precursor comprises natural graphite or synthetic graphite. Irrespective of the type of graphite used, a high content of graphene was obtained after the composition was subjected to the mechanical and chemical treatments. By mechanically treating the composition that comprises water and the graphene precursor, a composition comprising graphene and graphene stacks comprising 2-20 layers of graphene can be obtained. Preferably the mechanical treatment comprises wet ball milling since this increases the surface area of the graphene precursor in the composition, which enables increased interaction between the graphene precursor and the chemicals of the chemical treatment.

The content of graphene and the graphene stacks in the composition can be increased by subjecting the composition to a chemical treatment, preferably by mixing the composition with a surfactant, oxidant and an acid. The surfactant and acid increase the interlayer spacing between the layers of the graphene precursor and the graphene stacks, which allows for increased penetration of the oxidant into the interlayer space. The oxidant then causes the chemical breakdown of the graphene precursor into graphene and the graphene stacks. The oxidant also causes the chemical breakdown of stacked graphene into single-layer graphene or into graphene stacks comprising fewer layers. The chemical treatment also results in the formation of edge graphene. The acid preferably comprises a mild acid such as acetic acid. Mild acids are preferred over strong acids e.g. hydrochloric acid, since the generation of chloride ions that are known to increase the rate of corrosion in applied coatings is avoided. Moreover, by not using strong acids as such nitric acid, pitting of the zinc layer may be avoided. The oxidant preferably comprises hydrogen peroxide, although permanganate or perchloric acid can also be used. The use of weaker oxidants is also possible but these are less effective at chemically breaking down the graphene precursor and the graphene stacks into single-layer graphene and graphene stacks comprising fewer layers.

The chemical treatment may also comprise the step of mixing the composition with a surfactant. Suitable surfactants for use in this chemical treatment are for instance 0.3-3.0 wt % Antiterra® 250 (BYK) and 0.3-3.0 wt % Disperbyk® (BYK), or 0.5-1.5 wt % tetrabutyl ammonium salt.

The content of graphene and the graphene stacks in the composition can be increased by subjecting the composition to a second mechanical treatment. The second mechanical treatment results in the mechanical breakdown of graphene precursors, e.g. graphene precursors that were not broken down during a first mechanical treatment or during the chemical treatment into graphene and graphene stacks comprising 2-20 layers of graphene. Preferably the second mechanical treatment comprises sonication, more preferably ultrasonciation. Sonication and ultrasonciation are particularly effective at increasing the content of graphene in the composition.

Following the mechanical and chemical treatments, graphene and the graphene stacks are separated from the graphene precursor to form a graphene based composition. Preferably graphene and the graphene stacks are separated from the mechanically and chemically treated composition by centrifugation.

By mixing the graphene based composition with the first coupling agent capable of reacting with graphene and the graphene stacks, it is possible to obtain a composition that comprises functionalised graphene and functionalised graphene stacks. Such a composition can increase the adhesion of a coating composition when applied onto a metal substrate, e.g. a zinc or zinc alloy coating, or when coated onto a previously applied coating layer. In addition, the coupling agent reduces porosity within an applied coating, thereby reducing the rate at which the metal or metal alloy substrate is corroded.

By mixing the graphene based composition with chromium-free corrosion inhibitors, the corrosion inhibitors intercalate between the graphene layers of the graphene stacks. The corrosion inhibitors are preferably provided in a water based solution in order to avoid issues associated with the handling and disposal of organic solvents. Preferably the graphene based composition comprises between 0.01 and 0.5 wt % of the corrosion inhibitors. It was found that the stability of the graphene based composition decreased when the content of the corrosion inhibitors in the composition exceeded 0.5 wt %. In addition, a corrosion inhibitor content above 0.5 wt % could lead to cathodic delamination of a coating that comprises the graphene based composition.

In a preferred embodiment the composition that contains water and the graphene precursor is subjected to a first mechanical treatment, a chemical treatment and then a second mechanical treatment. This sequence (mechanical-chemical-mechanical) of treating the composition is particularly preferred since compositions containing a high content of graphene and graphene stacks can be obtained. In another embodiment the composition containing water and the graphene precursor is subjected to a chemical treatment prior to subjecting the composition to at least two mechanical treatments. Similarly, the composition containing water and the graphene precursor may be subjected to two mechanical treatments before being subjected to a chemical treatment. Compositions containing a high content of graphene may be obtained by following the method steps above.

In a preferred embodiment the graphene based composition is mixed with a second coupling agent that is capable of reacting with graphene, the graphene stacks and the first coupling agent. Mixing the graphene based composition with the second coupling agent results in a composition that comprises graphene and graphene stacks that are functionalised with the first coupling agent and the second coupling agent. Since the second coupling agent is capable of reacting with graphene, the graphene stacks and the first coupling agent, adjacent graphene and graphene stacks can be chemically linked. This has advantage of improving the corrosion inhibitive properties of a coating that comprises the corrosion inhibitive composition.

In an embodiment of the invention the composition is mixed with the first coupling agent and/or the second coupling agent before the step of separating graphene and the graphene stacks from the mechanically and chemically treated composition. It is particularly preferred to provide the first coupling agent and/or the second coupling agent as part of the chemical treatment, i.e. together with the oxidant, the acid and optionally the surfactant. By subjecting graphene and the graphene stacks to a two-step functioanlisation process, it is understood that a greater proportion of graphene and stacked graphene will become functionalised, resulting in improvements in adhesion and corrosion resistance.

When the method comprises the steps of providing the first coupling agent and the second coupling agent, one of the coupling agents may be added to the mechanically and chemically treated composition and the other coupling agent may be added to the graphene based composition. This avoids or at least reduces the undesirable reaction between the first coupling agent and the second coupling agent before the first coupling agent and the second coupling agent have reacted with graphene and the graphene stacks.

In a similar embodiment the first coupling agent may added to the graphene based composition in order to functionalise graphene and the graphene stacks with the first coupling agent. Subsequently, the second coupling agent may be added to the graphene based solution in order to functionalise graphene and the graphene stacks with the second coupling agent.

As the first coupling agent and/or the second coupling agent an organosilane could be used, comprising for instance a hydroxysilane, an epoxysilane or an aminosilane. The use of organosilanes provide in a water based solution avoiding problems associated with the handling and disposal of organic solvents. Preferably, the water based solution comprising the organosilane has a pH between pH 4 and pH7. When the organosilane is provided in a mildly acidic >pH 4-pH 6 or pH neutral water based solution, the lifetime of the composition may be extended.

When using organosilanes as coupling agent a first organosilane is hydrolysed in an aqueous solution and then added to the graphene based composition in order to functionalise graphene and the graphene stacks with the first organosilane. Subsequently, a second organosilane may be hydrolysed and then added to the graphene based solution in order to functionalise graphene and the graphene stacks with the second organosilane. The first and second hydrolysed organosilane solutions are preferably provided in a ratio between 1:3 and 3:1.

In a preferred embodiment the first coupling agent and/or the second coupling agent comprise an organofunctional siloxane, preferably an organofunctional siloxane oligomer. Preferably the organofunctional groups are selected from monoamines, diamines, amino-alkyls and alkyls and hydroxyls. These organofunctional siloxanes are water soluble and may be dispersed in aqueous solutions or water-based solutions, i.e. solutions that contain water and an appropriate organic solvent. Siloxanes and siloxane oligomers that comprise epoxy functional groups preferably also comprise hydroxyl groups to improve their solubility in water. In order to hydrolyse the first and second organofunctional siloxanes, the pH of the water-based or aqueous solution is preferably adjusted to an acidic pH, more preferably to a pH between pH 4 and pH 6. This prevents against excessive cross-linking before graphene and the graphene stacks are functionalised and also extends the pot-life of the solution. A small amount of organic solvent, e.g. ethanol, is produced as a by-product when the first and second organofunctional siloxanes or siloxane oligomers are hydrolysed.

In a preferred embodiment the composition containing water and the graphene precursor is subjected to a thermal and/or electromagnetic treatment. Preferably, the composition is thermally and/or electromagnetically treated after the chemical treatment. Subjecting the composition to a thermal and/or an electrochemical treatment promotes the breakdown of the graphene precursor into graphene and the graphene stacks. It also promotes the breakdown of graphene stacks into single-layer graphene or into graphene stacks comprising fewer layers. Subjecting the composition to a microwave (MW) treatment is preferred since a MW treatment is faster and more cost effective than a corresponding thermal treatment. The thermal and/or electromagnetic treatment could also be applied to the graphene based composition.

A third aspect of the invention relates to a method for manufacturing an coil coated strip or sheet, wherein the corrosion inhibitive composition prepared according to the second aspect of the invention is mixed with a coil coating composition. The coil coating composition comprising the corrosion inhibitive composition may thereafter be coil coated in the normal way onto the strip or sheet substrate.

In a preferred embodiment the coil coating composition comprises polyurethanes, polyesters, epoxies or acrylics. Such materials are particularly suitable for coil coating and exhibit good compatibility with the corrosion inhibitive composition.

The invention will be now be elucidated by way of example. These examples are intended to enable those skilled in the art to practice the invention and do not in anyway limit the scope of the invention as defined by the claims.

A water based solution comprising 10 g graphite (TIMCAL®) and water (100 mL) was provided in a ball mill and the solution was milled for two hours at 8000 rpm. The solution was then centrifuged to remove impurities. 50 mL of the supernatant fluid was then mixed with hydrogen peroxide (5 mL) and acetic acid (10 mL). This solution was then subjected to an ultrasonic treatment for 1 hr, after which the solution was centrifuged again to separate graphene and graphene stacks comprising 2-20 layers of graphene from the solution. A first hydrolysed solution (pH 6) was prepared by mixing 10 g of Hydrosil 2627 (Evonik) with water (100 mL). Hydrosil 2627 is an organofunctional siloxane oligomer, more specifically an aminoalkyl-functional oligomeric siloxane. A second hydrolysed solution (pH6) was also prepared by mixing 10 g of Hydrosil 2926 in 100 mL of water. Hydrosil 2926 is an organofunctional siloxane oligomer, more specifically an aminoalkyl oligomeric siloxane. The solution (100 mL) comprising the separated graphene and graphene stacks was then mixed with the first hydrolysed solution (10 mL) and subsequently with the second hydrolysed solution (30 mL). 100 ppm of cerium acetate was then added to this solution. 0.1 wt % of this solution was then mixed with a water based polyurethane primer comprising Hybridur 870® (30 g), Cymel® 385 (30 g) and water (100 mL). This solution was then applied onto a hot-dip galvanised steel strip that had been subjected to a chrome-free pre-treatment. The pre-treatment layer had a thickness of less than 1 μm. The coated substrate was then heated at 100° C. in a Mathis oven for one minute in order to cure the primer. After curing, the primer comprising the corrosion inhibitive composition had a dry film thickness of 2 μm. A chrome-free polyurethane primer comprising Hybridur 870® (30 g), Cymel® 385 (30 g) and water (100 mL) was subsequently applied and cured on the coated substrate at a reduced coating thickness of (15 μm). Finally, the coated substrate was provided with a polyurethane top coat (25 μm).

In order to investigate the corrosion inhibition properties of the corrosion inhibitive composition, the coated substrate was subjected to a salt spray test (ASTM B117) for 1500 hours. As a comparative example, the salt spray test was performed on a hot-dip galvanised steel substrate provided with a chrome-free pre-treatment, a chrome-free polyurethane primer (20 μm) and a polyurethane top coat (25 μm).

The results showed that compared to the comparative example, greater corrosion protection was afforded to the steel substrate when the primer contained the corrosion inhibitive composition of the invention.

The invention claimed is:

1. A coated strip or sheet comprising:
    a steel strip or sheet,
    a zinc or zinc alloy coating on the steel strip or sheet,
    a coating system film for inhibiting corrosion over the zinc or zinc alloy coating, and
    a top coat having a thickness between 15 and 200 μm over the coating system film;
    wherein the coating system film between the zinc or zinc alloy coating and the top-coat, said coating system film comprises an organic polymer selected from the group consisting of polyurethanes, polyesters, epoxies and acrylics, chromium-free corrosion inhibitors and a graphene-based corrosion inhibitive composition that comprises graphene and graphene stacks comprising 2-20 layers of graphene and a coupling agent comprising an organofunctional siloxane coupled to the graphene and the graphene stacks,
    wherein the graphene-based corrosion inhibitive composition comprises the chromium-free corrosion inhibitors intercalated between the graphene layers of the graphene stacks.

2. The coated strip or sheet according to claim 1, wherein the coating system film comprises 0.01 wt % of the corrosion inhibitive composition.

3. The coated steel strip or sheet according to claim 1, wherein the organofunctional siloxane coupling agent a first organosilane oligomer having one or more organofunctional groups selected from selected from a monoamines, diamines, amino-alkyls and alkyls, epoxies and hydroxyls and a second coupling agent being an organofunctional siloxane oligomer having one or more organofunctional groups selected from monoamines, diamines, amino-alkyls and alkyls, epoxies and hydroxyls which is different from the first organosilane oligomer.

4. The coated strip or sheet according to claim 3, wherein the chromium-free corrosion inhibitors comprise one or more cations selected from zinc, magnesium, titanium, zirconium, yttrium, lanthanum and cerium.

5. The coated strip or sheet according to claim 1, wherein the coupling agent comprises an organofunctional siloxane oligomer.

6. The coated strip or sheet according to claim 1, wherein the organofunctional siloxane coupling agent having one or more organofunctional groups selected from monoamines, diamines, amino-alkyls and alkyls, epoxies and hydroxyls.

7. The coated strip or sheet according to claim 6, wherein the corrosion inhibitive composition comprises a second coupling agent coupled to the graphene and the graphene stacks.

8. The coated strip according to claim 7, wherein the second coupling agent comprises an organofunctional siloxane.

9. The coated strip according to claim 8, wherein the second organofunctional siloxane coupling agent has one or more organofunctional groups selected from monoamines, diamines, amino-alkyls and alkyls, epoxies and hydroxyls.

10. The coated strip according to claim 7, wherein the second coupling agent comprises an organofunctional siloxane oligomer.

11. The coated strip or sheet according to claim 1, wherein the coating system comprises a primer coat between the zinc or zinc alloy coating and the top-coat, said primer coat comprising the organic polymer and the corrosion inhibitive composition.

12. The coated strip or sheet according to claim 11, wherein the coating system comprises a second primer coat having an absence of the corrosion inhibitive composition between the primer coat comprising the corrosion inhibitive composition and the top coat.

13. The coated strip or sheet according to claim 1, wherein the corrosion inhibitive composition is prepared by a method which comprises the steps of:
- subjecting a composition that contains water and a graphene precursor to at least two mechanical treatments and to a chemical treatment in order to form graphene and graphene stacks comprising 2-20 layers of graphene;
- separating graphene and the graphene stacks from the mechanically and chemically treated composition to form a graphene based composition;
- mixing the graphene based composition with a first coupling agent comprising an organofunctional siloxane that is capable of reacting with graphene and the graphene stacks, and
- mixing the graphene based composition with corrosion inhibitors to form an intercalated graphene compound in which the corrosion inhibitors are intercalated between the graphene layers of the graphene stack.

14. The coated strip or sheet according to claim 13, wherein the composition that contains water and the graphene precursor is subjected to a first mechanical treatment, a chemical treatment and then a second mechanical treatment.

15. The coated strip or sheet according to claim 14, wherein the mechanical treatments comprise wet ball milling and sonication.

16. The coated strip or sheet according to claim 14, wherein the chemical treatment comprises the steps of mixing the composition with an oxidant, optionally a surfactant and an acid.

17. The coated strip or sheet according to claim 14, wherein the graphene based composition is mixed with a second coupling agent comprising an organofunctional siloxane that is capable of reacting with graphene, the graphene stacks and the first coupling agent.

18. The coated strip or sheet according to claim 14, wherein the corrosion inhibitive composition is mixed with a coil coating composition comprising the organic polymer, after which the mixture is applied on a strip or sheet substrate by coil coating.

19. The coated strip or sheet according to claim 1, wherein the graphene based composition comprises between 0.01 and 0.5 wt % of the corrosion inhibitors.

20. The coated strip or sheet according to claim 1, wherein the top coat comprises an organic polymer selected from the group consisting of polyesters, polyurethanes, and plastisols.

21. The coated strip or sheet according to claim 1, wherein the top coat consists of an organic polymer selected from the group consisting of polyesters, polyurethanes, and plastisols.

22. The coated strip or sheet according to claim 1, wherein said graphene and graphene stacks comprise 4-10 layers of graphene.

23. The coated strip or sheet according to claim 1, wherein the top coat has no said graphene-based corrosion inhibitive composition.

* * * * *